US008726608B2

(12) United States Patent
O'Leary et al.

(10) Patent No.: US 8,726,608 B2
(45) Date of Patent: May 20, 2014

(54) APPARATUS AND METHOD FOR USING BOARD INSULATION AS BLOWN INSULATION

(75) Inventors: Robert J. O'Leary, Newark, OH (US); Michelle Korwin-Edson, Pataskala, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 315 days.

(21) Appl. No.: 12/640,984

(22) Filed: Dec. 17, 2009

(65) Prior Publication Data

US 2011/0146176 A1    Jun. 23, 2011

(51) Int. Cl.
*E04B 1/00*    (2006.01)
*B02C 18/06*    (2006.01)

(52) U.S. Cl.
USPC ........................................ 52/742.1; 241/225

(58) Field of Classification Search
USPC ............. 52/742.1; 241/60, 186.1, 186.5, 225; 414/412
See application file for complete search history.

(56) References Cited

U.S. PATENT DOCUMENTS

| | | | | |
|---|---|---|---|---|
| 1,831,779 A | * | 11/1931 | MacDonald | 264/131 |
| 2,311,773 A | * | 2/1943 | Patterson | 406/56 |
| 3,056,172 A | * | 10/1962 | Prentice et al. | 19/96 |
| 4,134,242 A | * | 1/1979 | Musz et al. | 52/309.1 |
| 4,236,654 A | * | 12/1980 | Mello | 222/238 |
| 4,829,738 A | * | 5/1989 | Moss | 52/742.13 |
| 5,462,238 A | * | 10/1995 | Smith et al. | 241/243 |
| 5,788,163 A | * | 8/1998 | Woten et al. | 358/1.14 |
| 5,829,649 A | * | 11/1998 | Horton | 222/636 |
| 6,047,518 A | * | 4/2000 | Lytle | 52/742.13 |
| 2006/0024457 A1 | * | 2/2006 | O'Leary et al. | 428/34.1 |
| 2007/0228200 A1 | * | 10/2007 | Ulitsch et al. | 241/101.741 |
| 2007/0234649 A1 | * | 10/2007 | Near et al. | 52/73 |
| 2008/0089748 A1 | * | 4/2008 | Johnson et al. | 406/136 |
| 2009/0107068 A1 | * | 4/2009 | Fay et al. | 52/309.6 |

OTHER PUBLICATIONS

Force Insulation Blowing Machines,Mar. 26, 2004, www.forceblowingmachines.com, p. 1-2.*

* cited by examiner

*Primary Examiner* — Elizabeth A Plummer
(74) *Attorney, Agent, or Firm* — Fraser Clemens Martin & Miller LLC; Charles F. Charpie (57) ABSTRACT

Apparatus for processing board insulation into granules of loosefill insulation are provided. The apparatus includes an upper unit having inlet and outlet ends. The inlet end is configured to receive board insulation. The upper unit is configured to break the board insulation into small pieces. A lower unit is connected to the upper unit. The lower unit is configured to receive the small pieces of board insulation exiting the upper unit. The lower unit includes a plurality of conditioning mechanisms configured to condition the small pieces thereby resulting in granules of loosefill insulation. The lower unit further includes a distribution mechanism configured to distribute the granules of loosefill insulation into an airstream. A distribution hose is connected to the lower unit and configured to convey the granules from the apparatus to a building insulation cavity. The granules are configured for use as loosefill insulation within the building cavity.

10 Claims, 5 Drawing Sheets

APPARATUS AND METHOD FOR USING BOARD INSULATION AS BLOWN INSULATION

BACKGROUND

Various insulative products or combinations of insulative products can be used to insulate buildings. Some of the insulative products include spray foams, loosefill insulation, board insulation and batts of insulation.

Spray foam insulation can include materials that are mixed at the building site and applied with a sprayer. The sprayer can be configured to introduce the spray foam insulation into joints, cavities, and penetrations of the building ceilings, floors and walls. In contrast to spray foam insulation, loosefill insulation includes a multiplicity of discrete, individual tufts, cubes, flakes, granules or nodules. Loosefill insulation can be applied to buildings by blowing the loosefill insulation into insulation cavities, such as sidewall cavities or an attic of a building. Loosefill insulation can be made from glass fibers, although other mineral fibers, organic fibers, and cellulose fibers can be used. Loosefill insulation can be applied using blowing insulation machines.

Board insulation can include extruded or expanded cellular materials formed into panels or boards. In some instances, the board insulation can be used for structural support of subsequently applied construction materials. Board insulation can also be installed or positioned into building insulation cavities.

Batts of insulation can include fibrous materials, such as the non-limiting example of glass fibers, and can be applied within cavities of the building.

In some instances it may be desirable to retrofit existing buildings with insulation. The existing buildings can have insulation cavities that are covered by common construction materials. As one example, the insulation cavity can be located in a wall structure and covered on an exterior side by sheathing and covered on an interior side by drywall.

It would be advantageous if insulation cavities in existing buildings could be insulated in an efficient, easy to apply manner with minimal damage to the existing building.

SUMMARY

In accordance with embodiments of this invention there are provided apparatus for processing board insulation into granules of loosefill insulation. The apparatus includes an upper unit having an inlet end and an outlet end. The inlet end is configured to receive board insulation. The upper unit is configured to break the board insulation into small pieces. The small pieces are configured to exit the upper unit through the outlet end. A lower unit is connected to the upper unit. The lower unit is configured to receive the small pieces of board insulation exiting the outlet end of the upper unit. The lower unit includes a plurality of conditioning mechanisms. The conditioning mechanisms are configured to condition the small pieces thereby resulting in granules of loosefill insulation. The lower unit further includes a distribution mechanism configured to distribute the granules of loosefill insulation into an airstream. A distribution hose is connected to the lower unit and configured to convey the granules of loosefill insulation from the apparatus to a building insulation cavity. The granules of loosefill insulation are configured for use as loosefill insulation within the building cavity.

In accordance with embodiments of this invention there are also provided methods of processing board insulation into granules of loosefill insulation. The methods include the steps of providing an apparatus configured for processing board insulation into granules of loosefill insulation, feeding board insulation into the apparatus, processing the board insulation into granules of loosefill insulation and distributing the granules of loosefill insulation to a building insulation cavity thereby creating a layer of loosefill insulation.

In accordance with embodiments of this invention there are also provided building constructions having an insulation cavity formed within a building structure and an insulative layer of material positioned within the cavity. The insulative layer of material has a plurality of granules of processed board insulation. The granules have an average major dimension in a range of from about 0.125 inches to about 0.25 inches.

In accordance with embodiments of this invention there are also provided apparatus for insulation material into granules of loosefill insulation. The apparatus includes an upper unit having an inlet end and an outlet end. The inlet end is configured to receive insulation materials. The upper unit is configured to break the insulation materials into small pieces. The small pieces are configured to exit the upper unit through the outlet end. A lower unit is connected to the upper unit. The lower unit is configured to receive the small pieces of insulation material exiting the outlet end of the upper unit. The lower unit includes a plurality of conditioning mechanisms. The conditioning mechanisms are configured to condition the small pieces thereby resulting in granules of loosefill insulation. The lower unit further includes a distribution mechanism configured to distribute the granules of loosefill insulation into an airstream. A distribution hose is connected to the lower unit and configured to convey the granules of loosefill insulation from the apparatus to a building insulation cavity. The granules of loosefill insulation are configured for use as loosefill insulation within the building cavity In accordance with embodiments of this invention there are also provided apparatus for processing insulation material into granules of loosefill insulation. The apparatus includes an inlet end configured to receive insulation materials. A plurality of conditioning mechanisms is positioned downstream from the inlet end and configured to condition the small pieces thereby resulting in granules of loosefill insulation. A distribution mechanism is positioned downstream from the plurality of conditioning mechanisms and is configured to distribute the granules of loosefill insulation into an airstream. A distribution hose is connected to the distribution mechanism and is configured to convey the granules of loosefill insulation from the apparatus to a building insulation cavity. The granules of loosefill insulation are configured for use as loosefill insulation within the building cavity Various advantages of this invention will become apparent to those skilled in the art from the following detailed description of the invention, when read in light of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

The description and figures disclose apparatus and methods for processing board insulation into granules of loosefill insulation and using the granules of loosefill insulation for insulating cavities. The insulation cavities can be any space within the building intended to be insulated, including the non-limiting examples of a building attic or sidewalls. Generally, the apparatus and methods are first configured to break board insulation into small pieces. Then, the small pieces of board insulation are further conditioned by the apparatus to form granules of loosefill insulation. The granules of loosefill insulation are conveyed to the insulation cavities and deposited in the insulation cavities to form one or more layers of insulation. The apparatus can be configured for processing newly manufactured board insulation or previously installed board insulation that has been removed from existing buildings. Additionally, the apparatus can be configured to process various sizes and types of board insulation.

As discussed above, existing buildings can be insulated with loosefill insulation. The loosefill insulation can be distributed or blown into insulation cavities by a blowing insulation machine. The blowing insulation machine can be configured to "condition" the insulation prior to distribution into the insulation cavities. The term "condition" as used herein, is defined to mean the forming of the granules of loosefill insulation to a desired density or size prior to distribution into an airstream. Blowing insulation machines can include various mechanisms or combinations of mechanisms, such as for example shredders, beater bars and agitators for final conditioning of the granules of loosefill insulation prior to distribution. Once conditioned, the granules of loosefill insulation can be distributed pneumatically through a distribution hose.

Figure 1:
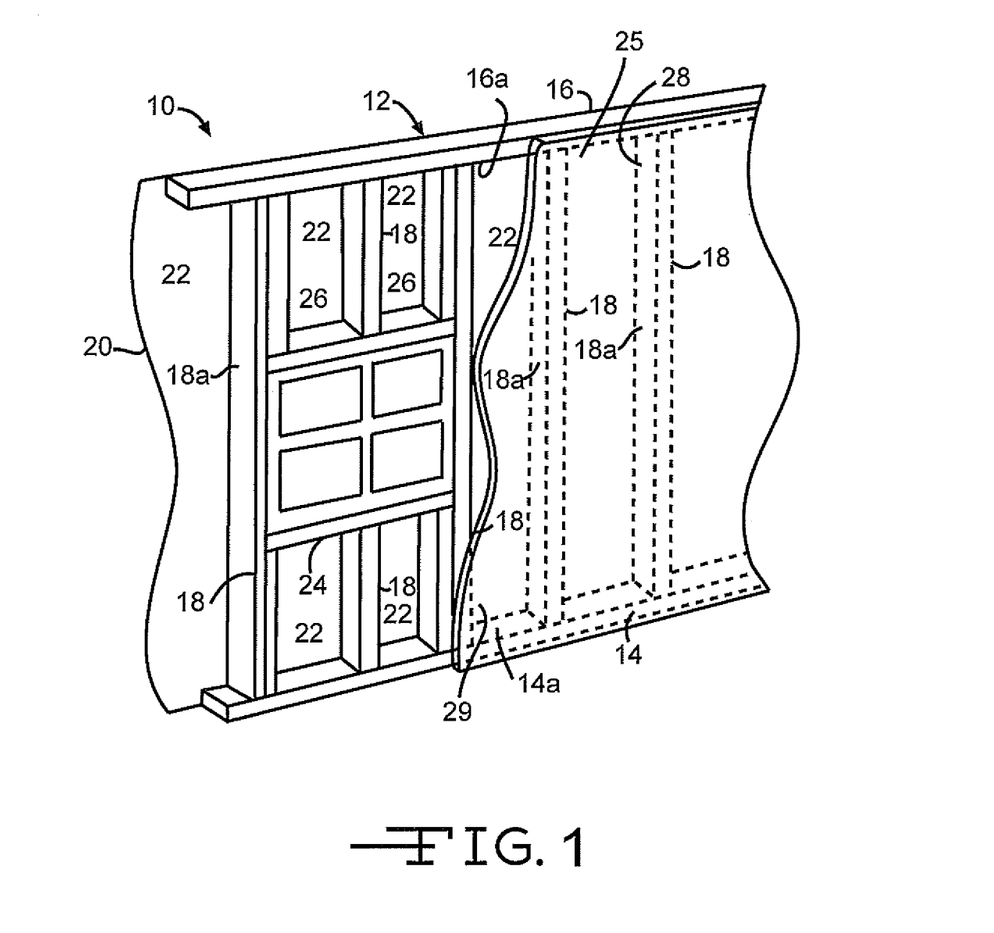
FIG. 1 is a perspective view of a portion of a building illustrating insulation cavities.

Referring now to FIG. 1, a portion of a building is illustrated generally at 10. The building 10 includes a sidewall 12. The sidewall 12 is configured to define interior space within the building and to support additional structural components. The sidewall 12 is formed from a bottom plate 14, a top plate 16 and a plurality of framing members 18 extending therebetween. The bottom plate 14 and the top plate 16 are substantially horizontal members configured to provide surfaces to which additional framing members are attached. In the illustrated embodiment, the bottom plate 14, top plate 16 and framing members 18 are made of wood. In other embodiments, the bottom plate 14, top plate 16 and framing members 18 can be made of other desired materials, including the non-limiting example of steel. The bottom plate 14, top plate 16 and framing members 18 can have any desired dimensions. The bottom plate 14, top plate 16 and framing members 18 have interior surfaces 14a, 16a and 18a, respectively.

Referring again to FIG. 1, the sidewall 12 is covered on one side by exterior sheathing 20 attached to an exterior side of the bottom plate 14, top plate 16 and framing members 18. The exterior sheathing 20 is configured to provide rigidity to the sidewall 12 and further configured to provide a surface for an exterior wall covering (not shown). In the illustrated embodiment, the exterior sheathing 20 is made of oriented strand board (OSB). In other embodiments, the exterior sheathing 20 can be made of other materials, such as for example plywood, waferboard, rigid foam or fiberboard, sufficient to provide rigidity to the sidewall 12 and to provide a surface for an exterior wall covering. As shown in FIG. 1, the exterior sheathing 20 has an interior surface 22. Optionally, the sidewall 12 can include building fixtures, including the non-limiting examples of a window 24 or door (not shown).

As shown in FIG. 1, the sidewall 12 is covered on another side by internal covering material 25 attached to an interior side of the bottom plate 14, top plate 16 and framing members 18. The internal covering material 25 is configured to cover the sidewall and further configured to define the interior portions of the building 10. In the illustrated embodiment, the internal covering material 25 is drywall. However, in other embodiments, the internal covering material 25 can be other desired materials, including the non-limiting examples of paneling and plaster. The internal covering material 25 has an inner surface 28 and an exterior surface 29.

Insulation cavities 26 are formed in the spaces between the plurality of framing members 18, the interior surface 22 of the exterior sheathing 20 and the interior surface 28 of the interior covering material 25. As illustrated in FIG. 1, the insulation cavities 26 can extend from the bottom plate 14 to the top plate 16. Alternatively, the insulation cavities 26 can extend from the bottom plate 14 or the top plate 16 to a building fixture, such as the window 24. While the insulation cavities 26 illustrated in FIG. 1 are shown as being located in the sidewall 12 of the building 10, it should be appreciated that other insulation cavities can occur in other locations of the building 10, such as the non-limiting example of an attic space. The insulation cavities 26 can have any size, shape or configuration.

Figure 2:
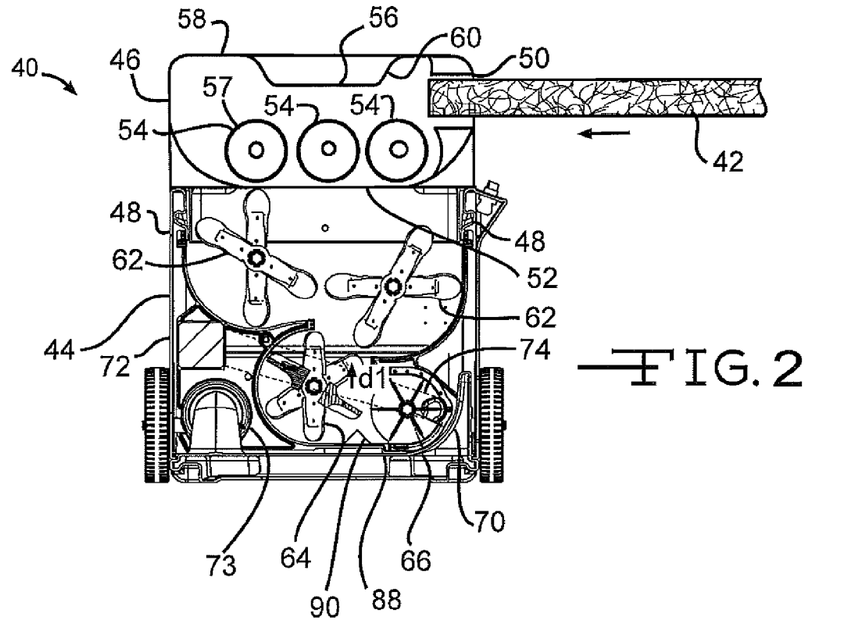
FIG. 2 is a front view in elevation, partially in cross-section, of a first embodiment of an apparatus configured to process board insulation into loosefill insulation granules.
Figure 3:
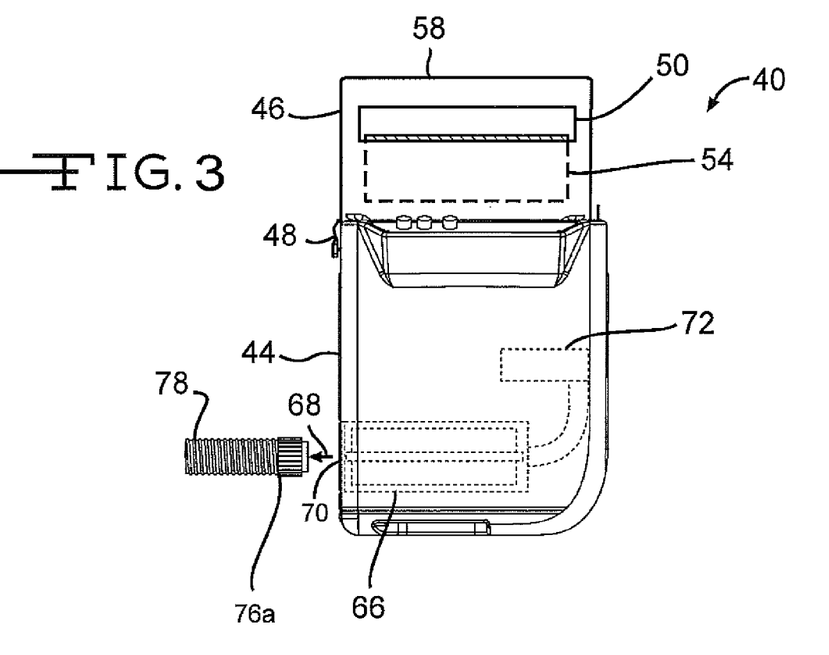
FIG. 3 is a side view in elevation of the apparatus of FIG. 2.

Referring now to FIGS. 2 and 3, a first embodiment of an apparatus 40 configured to process board insulation 42 into granules of loosefill insulation is illustrated. Generally, as described above, the apparatus 40 is configured to initially break the board insulation 42 into small pieces. The apparatus 40 is further configured to condition the small pieces of the board insulation, thereby forming granules of loosefill insulation (not shown). The granules of loosefill insulation are conveyed to insulation cavities.

In the illustrated embodiment, the board insulation 42 is a substantially rigid panel made from expanded polystyrene material. In other embodiments, the board insulation can be made from other foam-based insulation materials including the non-limiting examples of extruded polystyrene-based material, polyisocyanurate-based material, polyiso-based material or polyurethane-based materials. In still other embodiments, the board insulation 42 can be made from other insulative materials such as the non-limiting example of fiberglass. In still other embodiments, the board insulation 42 can be made from other flexible insulative materials, such as the non-limiting example of fiberglass batts.

As will be discussed in more detail below, the conditioned granules of loosefill insulation, formed from the board insulation 42, are substantially non-cohesive. The term non-cohesive, as used herein, is defined to mean the resistance of the granules to attract to each other, thereby forming larger structures. Additionally, the conditioned granules of loosefill insulation are substantially non-expanding. The term non-expanding, as used herein, is defined to mean the conditioned granules are resistant to increasing in volume or size as a result of being entrained in an airstream.

Referring again to FIGS. 2 and 3, the apparatus 40 includes a lower unit 44 and an upper unit 46. The lower unit 44 can be connected to the upper unit 46 by a plurality of fastening mechanisms 48 configured to make it easy to assemble and disassemble the upper unit 46 to the lower unit 44. The upper unit 46 has an inlet end 50 and an outlet end 52.

As shown in FIGS. 2 and 3, the upper unit 46 comprises a one piece segment and can be made of any material, such as metal or reinforced plastic, suitable to receive the board insulation 42 and introduce the board insulation 42 to subsequent conditioning operations. In other embodiments, the upper unit 46 can be constructed of various designs, such as discrete segments that fold upon themselves, telescoping segments that extend to open and locked positions or other designs suitable to receive the board insulation 42 and introduce the board insulation 42 to conditioning operations.

In one embodiment, as shown in FIGS. 2 and 3, the inlet end 50 of the upper unit 46 has a substantially rectangular cross-sectional shape that approximates the substantially rectangular cross-sectional shape of the board insulation 42. Typical sections of board insulation 42 have generally rectangular cross-sectional shapes. For example, the board insulation might have a height in a range of about 0.50 inches to about 4.0 inches, a width of about 24.0 inches and a length of about 96.0 inches. For the board insulation specified above, the inlet end 50 of the upper unit 46 might have a substantially rectangular cross-section shape of about 5.0 inches by 25.0 inches. The substantially rectangular cross-sectional shape of the inlet end 50 of the upper unit 46 allows the board insulation 42 to be easily received and fed through the upper unit 46.

As shown in FIGS. 2 and 3, one end of the board insulation 42 enters the inlet end 50 of the upper unit 46 and is introduced to a plurality of rollers 54. The rollers 54 are configured to break the board insulation 42 into small pieces of insulation. The term "small pieces", as used herein, is defined to mean the pieces of board insulation have an average major dimension in a range of from about 0.5 inches to about 6.0 inches. In the illustrated embodiment, the rollers 54 include knife edges 57 extending diagonally from one end of the roller 54 to the other end. The knife edges 57 are configured grab the board insulation 42 and break the board insulation 42 into small pieces of insulation. As will be explained in more detail below, in other embodiments the apparatus 40 can include other structures, mechanisms and devices configured to break the board insulation 42 into small pieces of insulation. While the illustrated embodiment shows a quantity of three rollers 54, it should be appreciated that any desired number of rollers 54 can be used. The small pieces of insulation exit the upper unit 46 through the outlet end 52. The size and spacing of the rollers 54 as well as the material from which the rollers 54 are made can be adjusted to suit the board insulation thicknesses and the board insulation materials being processed.

Optionally, the upper unit 46 can include a handle segment (not shown) to facilitate ready movement of the apparatus 40 from one location to another. However, the handle segment is not necessary to the operation of the apparatus 40.

As further shown in FIG. 2, the upper unit 46 includes an optional guide assembly 56 mounted to an interior surface of an upper wall 58. The guide assembly 56 is configured to urge the board insulation 42 against the plurality of rollers 54 as the board insulation 42 moves into the upper unit 46. In the illustrated embodiment, the guide assembly 56 includes an angled member 60 extending from the upper wall 58 of the upper unit 46. In operation, as the board insulation 42 enters the inlet end 50 of the upper unit 46, the board insulation encounters the angled member 60. As the board insulation 42 further traverses the inlet end 50 of the upper unit 46, the board insulation 42 is urged by the angled member 60 against the rollers 54. The angled member 60 can be made of a rigid material, such as plastic, metal or any other material suitable to urge the board insulation 42 against the rollers 54 as the board insulation 42 traverses the inlet end 50 of the upper unit 46. In the illustrated embodiment, the angled member 60 can be integrally formed as part of the upper unit 46. In other embodiments, the angled member 60 can be a separate member that is adjustably attached to the upper unit 46. In this embodiment, the angled member 60 can be adjusted to accommodate varying thicknesses of the board insulation 42. In other embodiments, the angled member 60 can extend as a rigid structure from the upper wall 58 of the upper unit 46. However in other embodiments, the angled member 60 can be a flexible member or a structure providing some flexibility, such as the non-limiting example of a spring-loaded structure. Optionally, the angled member 60 can be coated with a low coefficient of friction material configured to allow the board insulation 42 to readily traverse the guide assembly 56.

As discussed above, the small pieces of insulation exit the upper unit 46 through the outlet end 52 and enter the lower unit 44. Generally, the lower unit 44 includes a plurality of conditioning mechanisms configured for final conditioning of the small pieces of insulation and a distribution system configured for distributing the conditioned granules of loosefill insulation into an airstream.

Referring again to FIG. 2, the plurality of conditioning mechanisms is mounted in the lower unit 44 downstream from the outlet 52 of the upper unit 46. In the illustrated embodiment, the conditioning mechanisms include a plurality of low speed conditioners 62 and at least one high speed conditioner 64. The low speed conditioners 62 are configured to further break the small pieces of insulation into smaller insulation granules as the small pieces of insulation are discharged from the outlet end 52 of the upper unit 46 into the lower unit 44. The high speed conditioner 64 is configured for final conditioning of the insulation pieces into granules of loosefill insulation. While the illustrated embodiment is described as having a plurality of low speed conditioners 62 and at least one high speed conditioner 64, it should be appreciated that any desired quantity and combination of low speed conditioners 62 and high speed conditioners 64 can be used. It should further be appreciated that any type, quantity and configuration of any devices or mechanisms configured to condition the pieces of board insulation into granules of loosefill insulation, such as the non-limiting examples of shredders, separators, clump breakers and beater bars can be used. In the illustrated embodiment, the average diameter of the resulting granules of loosefill insulation is in a range of from about 0.125 inches to about 0.250 inches. Alternatively, the average diameter of the resulting granules of loosefill insulation can be less than about 0.125 inches or more than about 0.250 inches.

In the illustrated embodiment, the conditioning mechanisms, 62 and 64, rotate at a speed in a range of from about 40 rpm to about 500 rpm. In other embodiments, the conditioning mechanisms, 62 and 64, can rotate at speeds less than about 40 or more than about 500 rpm.

Referring again to FIG. 2, a discharge mechanism 66 is positioned in the lower unit 44 downstream from the conditioning mechanisms, 62 and 64, and is configured to distribute the conditioned granules of loosefill insulation into an airstream 68 as shown in FIG. 3. In the illustrated embodiment, the discharge mechanism 66 is a rotary valve. In other embodiments, the discharge mechanism 66 can be other structures, mechanisms or devices sufficient to distribute the conditioned granules of loosefill insulation into the airstream 68.

Referring again to FIGS. 2 and 3, the conditioned granules of loosefill insulation are driven through the discharge mechanism 66 and through a machine outlet 70 by the airstream 68 provided by a blower 72 mounted in the lower unit 44. In other embodiments, the airstream 68 can be provided by another method, such as by a vacuum, sufficient to provide an airstream 68 driven through the discharge mechanism 66. In the illustrated embodiment, the blower 72 provides the airstream 68 to the discharge mechanism 66 through a duct 74. Alternatively, the airstream 68 can be provided to the discharge mechanism 66 by another structure, such as by a hose or pipe, sufficient to provide the discharge mechanism 66 with the airstream 68.

Figure 4:
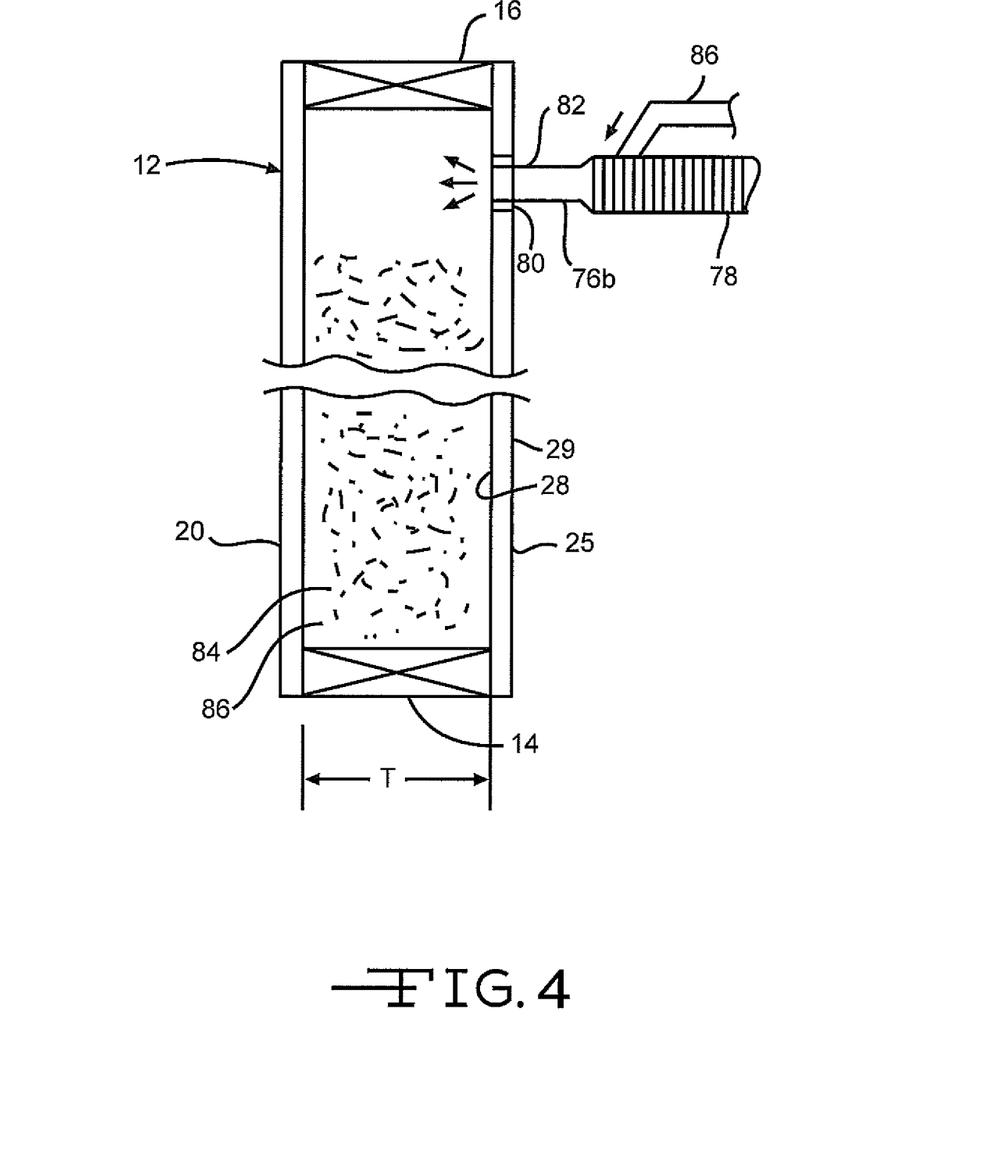
FIG. 4 is a side view in elevation of a portion of the building of FIG. 1 illustrating loosefill insulation granules in an insulation cavity.

Referring again to FIG. 3, a first end 76a of a distribution hose 78 is connected to the machine outlet 70 and a second end 76b of the distribution hose 78 is positioned in the insulation cavity 26 as shown in FIG. 4.

Referring again to FIGS. 2 and 3, in operation the board insulation 42 is fed into the inlet end 50 of the upper unit 46. The guide assembly 56 guides the board insulation 42 to the rollers 54 positioned in the upper unit 46. The rollers 54 break the board insulation 42 into small pieces of insulation. The small pieces of insulation exit the outlet end 52 of the upper unit 46 and enter the conditioning mechanisms, 62 and 64, positioned in the lower unit 44. The conditioning mechanisms, 62 and 64, condition the small pieces of insulation to a desired average diameter, thereby forming granules of loosefill insulation. The conditioned granules of loosefill insulation exit the conditioning mechanisms, 62 and 64, and enter the discharge mechanism 66 for distribution into the airstream 68 provided by the blower 72. The airstream 68, with the entrained granules of loosefill insulation, exits the lower unit 44 at the machine outlet 70 and flows through the distribution hose 78 toward the insulation cavity 26.

The conditioning mechanisms, 62 and 64, discharge mechanism 66 and the blower 72 are mounted for rotation. They can be driven by any suitable means, such as by a motor 73 or other means sufficient to drive rotary equipment. Alternatively, the conditioning mechanisms, 62 and 64, discharge mechanism 66 and the blower 72 can be provided with its own motor. In the illustrated embodiment, the conditioning mechanisms, 62 and 64, discharge mechanism 66 and the blower 72 are configured to operate on a single 110 volt, 15 amp power source provided to the apparatus 40. In other embodiments, the conditioning mechanisms, 62 and 64, discharge mechanism 66 and the blower 72 can be configured to operate on multiple 110 volt, 15 amp power lines or on a single 220 volt power source.

Referring again to FIGS. 2 and 3, when the upper unit 46 is removed from the lower unit 44, the operator of the apparatus 40 has ready access to the rollers 54 positioned in the upper unit 46 and to the conditioning mechanisms, 62 and 64, positioned in the lower unit 44 for inspection, cleaning, maintenance or any other service or safety requirement. Optionally, to ensure the safety of the operator, the upper unit 46 can be provided with at least one electrical interlock (not shown) configured to disconnect power to the lower unit 44 such that the motor 73 cannot run while the upper unit 46 is removed from the lower unit 44. Upon return of the upper unit 46 to its normal operating position atop the lower unit 44, the electrical interlock connects electrical power to the lower unit 44 and the motor 73 such that the motor 73 can operate. In the illustrated embodiment, the electrical interlock is a magnetic switch. Alternatively, the electrical interlock can be any structure, switch or assembly that can interrupt power to the lower unit 44 when the upper unit 46 is removed from the lower unit 44 and connect power to the lower unit 44 when the upper unit 46 is reassembled to the lower unit 44.

Optionally, the apparatus 40 can include at least one viewing port (not shown) configured to allow the user to view the insulation within the apparatus 40. In one embodiment, the viewing port can be a clear plastic window, of generally rectangular shape, mounted to the upper unit 46 such that the operator can easily view the board insulation 42 engaging the rollers 54. Alternatively, the viewing port can be a plurality of viewing ports in either the upper unit 46 or the lower unit 44 or the viewing port could be made of any material, shape or configuration that allows the operator to view the insulation within any portion of the apparatus 40.

Additionally, the apparatus 40 can include at least one optional apparatus light (not shown) mounted in the apparatus 40 at a convenient point such as to allow the apparatus user to view the insulation within the apparatus 40. In one embodiment, the optional apparatus light can be a low voltage illumination means configured to light the interior of the apparatus 40. In another embodiment, the apparatus 40 could include a plurality of apparatus lights mounted at convenient points to illuminate various segments within the apparatus 40. In still other embodiments, the apparatus lights could be mounted at the inlet end 50 of the upper unit 46 with the resulting illumination trained toward the outlet end 52 of the upper unit 46 or any other means of lighting the interior of the apparatus 40 sufficient to allow visual inspection through the viewing port.

Referring again to FIG. 2, the discharge mechanism 66 has an optional side inlet 88 and an optional choke 90. The side inlet 88 is configured to receive the conditioned granules of loosefill insulation exiting from the high speed conditioner 64. In the illustrated embodiment, the high speed conditioner 64 is positioned to be adjacent to the side inlet 88 of the discharge mechanism 66. In other embodiments, other conditioning mechanisms can be positioned adjacent to the side inlet 88 of the discharge mechanism 66. In still other embodiments, the conditioning mechanisms can be positioned in other suitable locations. As will be described in detail below, the choke 90 is configured to redirect larger pieces of board insulation past the side inlet 88 of the discharge mechanism 66 and back to the low speed conditioners 62 for further conditioning.

Referring again to FIG. 2, the choke 90 is configured to simultaneously partially obstruct the side inlet 88 of the discharge mechanism 66 and to redirect the larger pieces of board insulation exiting from the high speed conditioner 64 to a substantially upward direction dl. Traveling in direction dl, the larger pieces of board insulation are redirected past the side inlet 88 of the discharge mechanism 66 to the low speed conditioners 62 for recycling and further conditioning. Referring again to the embodiment shown in FIG. 2, the generally upward direction dl is substantially tangential to the side inlet 88 of the discharge mechanism 66. Alternatively, the generally upward direction di can be in other directions. While the embodiment shown in FIG. 2 includes a choke 90, it should be understood that the choke 90 is optional and the apparatus 40 can be practiced without the choke 90.

Referring now to FIG. 4, a portion of the sidewall 12 is illustrated having the top plate 16, bottom plate 14, exterior sheathing 20 and interior covering 25. The top plate 16, bottom plate 14, exterior sheathing 20 and interior covering 25 define the insulation cavity 26. In operation, an aperture 80 is formed in the interior covering 25. In the illustrated embodiment, the aperture 80 has a circular shape and a diameter in a range of from about 0.75 inches to about 1.25 inches. Alternatively, the aperture 80 can have other shapes, including the non-limiting shape of a square and can have a major dimension less than about 0.75 inches or more than about 1.25 inches. The aperture 80 can be formed in the interior covering 25 in any desired manner, including the non-limiting examples of cutting with a saw or drilling a hole with a drill.

The second end 76b of the distribution hose 78 includes a nozzle 82. The nozzle 82 is configured for placement within the aperture 80 such that granules of loosefill insulation flowing through the distribution hose 78 can enter the insulation cavity 26. In the illustrated embodiment, the nozzle 82 has a circular cross-sectional shape and a diameter that is less than the diameter of the aperture 80. In other embodiments, the nozzle 82 can have other cross-sectional shapes sufficient for placement within the aperture 80.

The airstream 68, with the entrained conditioned granules of loosefill insulation, exits the lower unit 44 at the machine outlet 70 and flows through the distribution hose 78 toward the insulation cavity 26. The airstream 68 flows through the nozzle 82 and into the insulation cavity 26. The conditioned granules of loosefill insulation (illustrated in FIG. 4 collectively as reference number 84) are deposited in the insulation cavity 26 and form a layer of insulation 86.

The layer of insulation 86 has a thickness T. In the illustrated embodiment, the thickness T is in a range of from about 1.5 inches to about 7.5 inches. However in other embodiments, the thickness T can be less than about 1.5 inches or more than about 7.5 inches.

The layer of insulation 86 has an insulative value (R) based on the thickness T and also based on the material forming the original board insulation. As one non-limiting example, a thickness T of approximately 3.5 inches and granules of loosefill insulation formed from board insulation made from polystyrene results in an insulative value in a range of about 15 to about 16. Other combinations of thickness T and board insulation materials can result in insulative values of less than about 15 or more than about 16.

Optionally as shown in FIG. 4, the second end 76b of the distribution hose 78 can be fitted with an applicator 86. The applicator 86 is configured to apply a coating to the granules of loosefill insulation flowing though the distribution hose 78. In one embodiment, the coating can be an adhesive configured to adhere the granules of loosefill insulation to each other as the granules are positioned in the insulation cavity 26. By adhering the granules of loosefill insulation to each other, the granules form a substantially rigid structure within the insulation cavity 26. The substantially rigid structure formed by the adhered granules has a lower potential for settling within the insulation cavity 26, thereby increasing the effectiveness of the layer of insulation 84.

In one embodiment, the coating can be an acrylic material. However, it should be understood that the coating can be other desired materials.

While the embodiment illustrated in FIG. 4 shows the applicator 86 as configured to apply the coating to the granules of loosefill insulation within the distribution hose 78, it should be appreciated that the applicator 86 can be configured to apply the coating as the granules exit the nozzle 82.

The embodiment of the apparatus 40 illustrated in FIGS. 2-4 advantageously provides many benefits. However, in some instances not all of the advantages will be realized. First, the apparatus 40 is configured to apply granules of loosefill insulation to insulation cavities 26 positioned within existing building structures without incurring significant damage to the existing building structure. The expense and time of removing existing walls and reinstalling new walls is eliminated.

Second, as only a small aperture is required, there is minimal damage to the existing walls of the building structure.

Third, the conditioned granules of loosefill insulation are substantially non-cohesive and substantially non-expanding. The conditioned granules can flow through the nozzle 82 without substantially plugging the distribution hose 78 or the nozzle 82. Further, the substantially non-cohesive and substantially non-expanding nature of the conditioned granules provides for conveyance of the granules through the distribution hose 78 with a lower volume of air.

Fourth, board insulation is easily ground and conditioned into granules of loosefill insulation. The capability of the board insulation to easily form granules of loosefill insulation results in a simple, compact energy efficient apparatus 40.

Finally, the apparatus 40 is configured for use with newly manufactured board insulation as well as previously installed board insulation of varying shapes and sizes. Accordingly, the apparatus 40 is configured for recycling of previously discarded insulation materials.

While the embodiment illustrated in FIGS. 2-4 show an aperture 80 being formed in the interior covering 25, it should be appreciated that other embodiments the aperture can be formed in the exterior sheathing 20.

Figure 5:
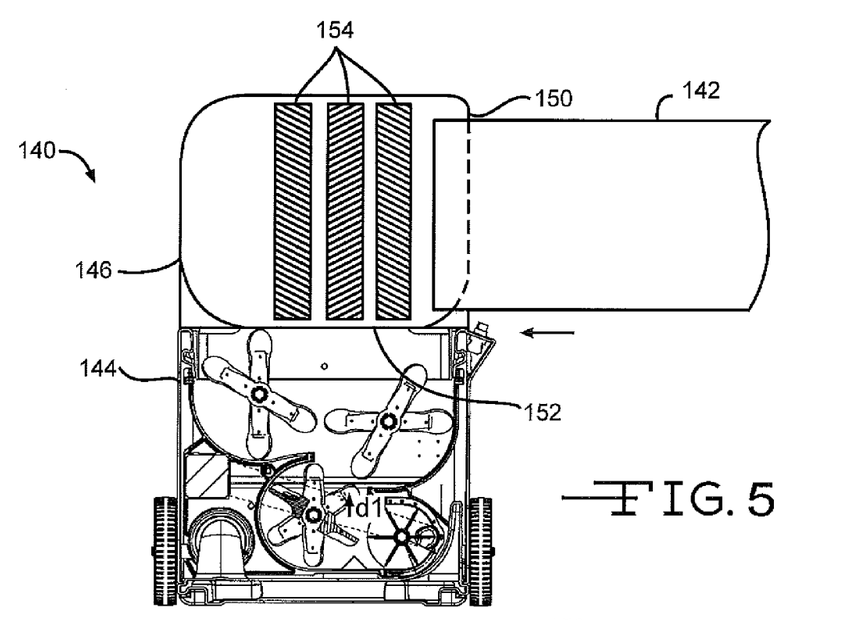
FIG. 5 is a front view in elevation, partially in cross-section, of a second embodiment of an apparatus configured to process board insulation into loosefill insulation granules.
Figure 6:
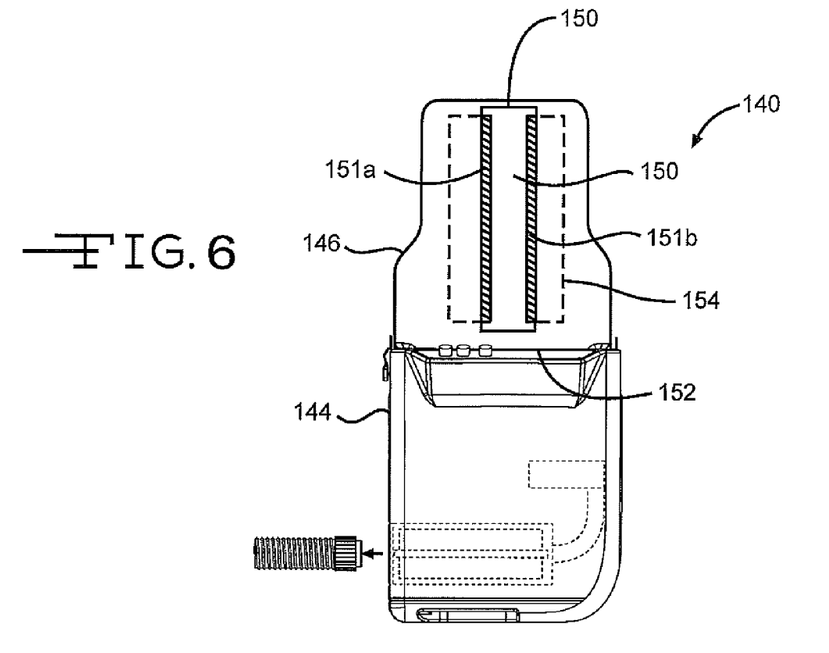
FIG. 6 is a side view in elevation of the apparatus of FIG. 5.

While the apparatus 40 illustrated in FIGS. 2 and 3 shows the board insulation 42 being fed into the inlet end 50 of the upper unit 42 such that the major surfaces of the board insulation 42 are oriented to be substantially horizontal, it should be appreciated that in other embodiments the board insulation 42 can be fed into the inlet end of the upper unit in other orientations. Referring now to FIGS. 5 and 6, an apparatus 140 is illustrated. The apparatus 140 includes a lower unit 144 connected to an upper unit 146. The lower unit 144 can be the same as, or similar to, the lower unit 44 illustrated in FIGS. 2 and 3 and described above. However, the lower unit 144 can be different from the lower unit 44. The lower unit 144 can be connected to the upper unit 146 in any desired manner, including by use of the fastening mechanisms 48 illustrated in FIGS. 2 and 3 and described above.

As shown in FIGS. 5 and 6, the upper unit 146 comprises a one piece segment and can be made from any desired materials including the same materials as the upper unit 46 illustrated in FIGS. 2 and 3 and discussed above. The upper unit 146 has an inlet end 150, an outlet end 152 and a plurality of grinding rollers 154. In the embodiment shown in FIGS. 5 and 6, the inlet end 150 of the upper unit 146 can have the same substantially rectangular cross-sectional shape as the inlet end 50 of the upper unit 46 illustrated in FIG. 2 and discussed above. However, the inlet end 150 of the upper unit 150 can other desired cross-sectional shapes. The substantially rectangular cross-sectional shape of the inlet end 150 of the upper unit 146 allows the board insulation 142 to be easily received and fed through the upper unit 146. As shown in FIG. 6, the inlet end 150 of the upper unit 146 is oriented such that longitudinal sides 151a and 151b of the inlet end 150 are oriented to be substantially vertical. The substantially vertical orientation of the longitudinal sides 151a and 151b allows the board insulation 142 to be fed into the upper unit 146 such that the major surfaces of the board insulation 142 are oriented to be substantially vertical.

Referring again to FIGS. 5 and 6, the board insulation 142 is fed into the inlet end 150 of the upper unit 146 and is introduced to the plurality of grinding rollers 154. The grinding rollers 154 are configured to break the board insulation 142 into small pieces of insulation. In the illustrated embodiment, the grinding rollers 154 include projections (not shown) configured break the board insulation 142 into pieces and grind the broken pieces of the board insulation 142 into smaller pieces of insulation. In one embodiment, the projections are mating teeth. However, in other embodiments, the projections can be any desired structure, mechanism or device sufficient to break the board insulation into pieces and grind the pieces into smaller pieces. In one embodiment, the projections of the grinding rollers 154 intersect with the projections of adjacent grinding rollers 154. In other embodiments, the projections are not required to intersect with the projections on adjacent grinding rollers 154.

As shown in FIG. 6, the grinding rollers 154 can be arranged such that the grinding rollers 154 are positioned on both sides of the board insulation 142. Alternatively, the grinding rollers 154 can be positioned on one side of the board insulation 142 and optional guide assemblies (not shown) can be positioned on the opposite side of the board insulation 142. While the illustrated embodiment shows a quantity of three grinding rollers 154, it should be appreciated that any desired number of grinding rollers 154 can be used. As discussed above for the apparatus 40 illustrated in FIGS. 2 and 3, the small pieces of insulation exit the upper unit 146 through the outlet end 152.

Figures 7, 8:
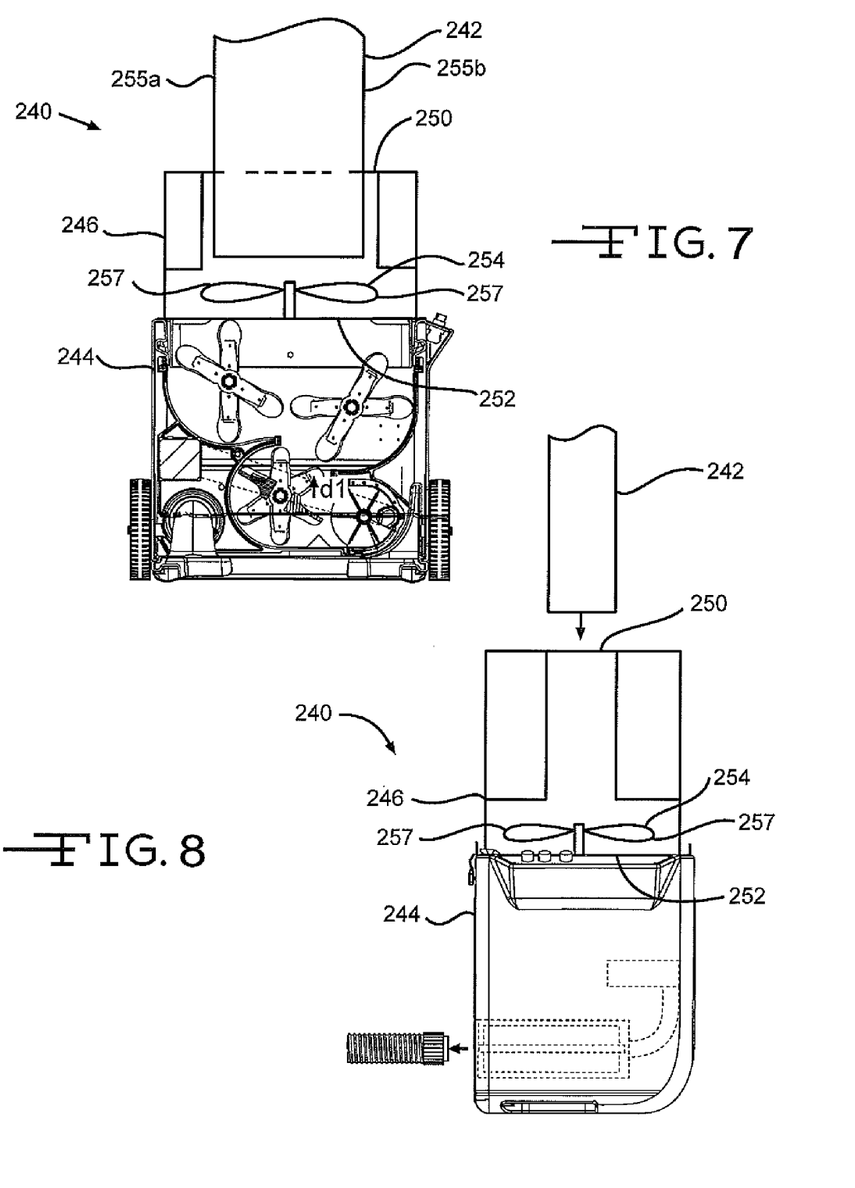
FIG. 7 is a front view in elevation, partially in cross-section, of a third embodiment of an apparatus configured to process board insulation into loosefill insulation granules.
FIG. 8 is a side view in elevation, partially in cross-section, of the apparatus of FIG. 7.

While the apparatus 40 illustrated in FIGS. 2 and 3 shows the inlet end 50 positioned in a side location of the upper unit 50, and the apparatus 140 illustrated in FIGS. 5 and 6 also shows the inlet end 150 positioned in a side location of the upper unit 150, it should be appreciated that in other embodiments, the inlet end of the upper unit can be positioned in other locations of the upper unit. One example of an inlet end being positioned in another location of the upper unit is illustrated in FIGS. 7 and 8. An apparatus 240, having a lower unit 244 connected to an upper unit 246. The lower unit 244 can be the same as, or similar to, the lower unit 44 illustrated in FIGS. 2 and 3 and described above. However, the lower unit 244 can be different from the lower unit 44. The lower unit 244 can be connected to the upper unit 246 in any desired manner, including by use of the fastening mechanisms 48 illustrated in FIGS. 2 and 3 and described above.

As shown in FIGS. 7 and 8, the upper unit 246 comprises a one piece segment and can be made from any desired materials including the same materials as the upper unit 46 illustrated in FIGS. 2 and 3 and discussed above. The upper unit 246 has an inlet opening 250, an outlet end 252 and at least one cutter 254. In one embodiment, as shown in FIGS. 7 and 8, the inlet opening 250 of the upper unit 246 can have the same substantially rectangular cross-sectional shape as the inlet end 50 of the upper unit 46 illustrated in FIG. 2 and discussed above. However, the inlet opening 250 of the upper unit 250 can other desired cross-sectional shapes. The substantially rectangular cross-sectional shape of the inlet opening 250 of the upper unit 246 allows the board insulation 242 to be easily received and fed through the upper unit 246. As shown in FIGS. 7 and 8, the inlet opening 250 of the upper unit 246 is oriented such that longitudinal sides 255a and 255b of the board insulation 242 are oriented to be substantially vertical when the board insulation 242 is fed into the inlet opening 250.

As shown in FIGS. 7 and 8, the board insulation 242 is fed into the inlet opening 250 of the upper unit 246 and is introduced to at least one cutter 254. The cutter 254 is configured to break the board insulation 242 into small pieces of insulation. In the illustrated embodiment, the cutter 254 includes a plurality of blades 257, thereby resulting in a structure similar to a fan blade or a propeller. However, in other embodiments, the cutter 254 can be any desired structure, mechanism or device sufficient to break the board insulation 242 into small pieces. While the illustrated embodiment is shown having a single cutter 254 with horizontally oriented blades 257, it should be appreciated that the apparatus can include any desired number of cutters having blades in any desired orientation. As discussed above for the apparatus 40 illustrated in FIGS. 2 and 3, the small pieces of insulation exit the upper unit 246 through the outlet end 252.

While the embodiments illustrated in FIGS. 2-8 show various combinations of rollers, cutters, grinders, side inlets, inlet openings and conditioners, it should be appreciated that the apparatus can include any desired combination of rollers, cutters, grinders, side inlets, inlet openings and conditioners sufficient to process board insulation into granules of loosefill insulation for use as loosefill insulation.

While the embodiments illustrated in FIGS. 2-8 show various apparatus having an upper unit configured for breaking the board insulation into small pieces and a lower unit configured for processing the small pieces of board insulation into granules, it is within the contemplation of this invention that the apparatus can simply contain a single conditioning mechanism configured for processing the board insulation into granules of loosefill insulation. The single conditioning mechanism would receive the board insulation and process the board insulation into the granules of loosefill insulation.

While the embodiments illustrated in FIGS. 2-8 show apparatus configured for processing board insulation into granules of loosefill insulation, it should be appreciated that in other embodiments, the apparatus could be configured to process insulation materials in other forms, such as the non-limiting examples of pre-ground insulation materials, insulation beads and insulation pellets.

The principle and mode of operation of the apparatus for processing board insulation into granules of loosefill insulation have been described in certain embodiments. However, it should be noted that the apparatus for processing board insulation into granules of loosefill insulation may be practiced otherwise than as specifically illustrated and described without departing from its scope.

What is claimed is:

1. An apparatus for processing rigid board insulation into granules of loosefill insulation, the apparatus comprising:
   an upper unit having a housing, the housing having an inlet end and an outlet end, the inlet end configured to receive rigid board insulation, the upper unit having a plurality of rollers with circumferential edges configured to break the rigid board insulation into small pieces, the small pieces configured to exit the upper unit through the outlet end;
   a lower unit having a housing distinct from the upper unit housing, the lower unit housing removably connected to the upper unit housing, the lower unit configured to receive the small pieces of rigid board insulation exiting the outlet end of the upper unit, the lower unit including a plurality of rotating low speed conditioners positioned vertically above rotating high speed conditioners, the low speed conditioners are configured to further break the small pieces of rigid board insulation into smaller pieces of rigid board insulation and the high speed conditioners are configured to condition the smaller pieces of rigid board insulation, thereby resulting in granules of loosefill insulation having a desired average diameter, the lower unit further including a rotary valve configured to distribute the granules of loosefill insulation into an airstream provided by a blower; and
   a distribution hose connected to the lower unit and configured to convey the granules of loosefill insulation from the apparatus to a building insulation cavity;
   wherein the granules of loosefill insulation are configured for use as loosefill insulation within the building cavity,
   wherein the combination of the low speed conditioners, high speed conditioners, rotary valve and blower are configured to operate on a single 110 volt, 15 amp power source.

2. The apparatus of claim 1, wherein the inlet end of the upper unit is configured such that the major surfaces of the rigid board insulation are in a horizontal orientation when the rigid board insulation is fed into the inlet end.

3. The apparatus of claim 1, wherein the upper unit includes a guide assembly configured to guide the rigid board insulation into the plurality of rollers.

4. The apparatus of claim 1, wherein the granules of loosefill insulation have an average major dimension in a range of from about 0.125 inches to about 0.25 inches.

5. The apparatus of claim 1, wherein the granules of loosefill insulation are substantially non-cohesive.

6. The apparatus of claim 1, wherein the granules of loosefill insulation are substantially non-expanding.

7. The apparatus of claim 1, wherein the small pieces of rigid board insulation exiting the upper unit have an average major dimension in a range of from about 1.00 inches to about 3.0 inches.

8. An apparatus for processing rigid board insulation into granules of loosefill insulation, the apparatus comprising:
   an upper unit having a housing, the housing having an inlet end and an outlet end, the inlet end configured to receive rigid board insulation, the upper unit having a plurality of rollers with circumferential knife edges configured to break the rigid board insulation into small pieces, the small pieces configured to exit the upper unit through the outlet end;
   a lower unit having a housing distinct from the upper unit housing, the lower unit housing removably connected to the upper unit housing, the lower unit configured to receive the small pieces of rigid board insulation exiting the outlet end of the upper unit, the lower unit including a plurality of rotating low speed conditioners positioned vertically above rotating high speed conditioners, the low speed conditioners are configured to further break the small pieces of rigid board insulation into smaller pieces of rigid insulation and the high speed conditioners, positioned downstream from the low speed conditioners, are configured to condition the smaller pieces of rigid insulation material, thereby resulting in granules of loosefill insulation having a desired average diameter, the lower unit further including a rotary valve configured to distribute the granules of loosefill insulation into an airstream, the rotary valve having a side inlet; and
   a distribution hose connected to the lower unit and configured to convey the granules of loosefill insulation from the apparatus to a building insulation cavity;
   wherein the granules of loosefill insulation are configured for use as loosefill insulation within the building cavity, and
   wherein a choke is positioned between the high speed conditioners and the side inlet of the rotary valve, the choke configured to redirect larger pieces of rigid board insulation back to the low speed conditioners for further shredding.

9. The apparatus of claim 8, wherein the rigid board insulation is in the form of pellets.

10. An apparatus for processing rigid board insulation into granules of loosefill insulation, the apparatus comprising:
   a chute having a housing, the housing having an inlet end and an outlet end, the inlet end configured to receive rigid board insulation, the chute having a plurality of rollers with circumferential knife edges configured to break the rigid board insulation into small pieces, the small pieces configured to exit the chute through the outlet end;
   a lower unit having a housing distinct from the chute housing, the lower unit housing removably connected to the chute housing, the lower unit configured to receive the small pieces of rigid board insulation exiting the outlet end of the chute, the lower unit including a plurality of rotating low speed conditioners positioned vertically above rotating high speed conditioners, the plurality of low speed and high speed conditioners are configured to condition the small pieces thereby resulting in granules of loosefill insulation;
   a rotary valve positioned downstream from the plurality of low speed conditioners and high speed conditioners and configured to distribute the granules of loosefill insulation into an airstream, the rotary valve having a side inlet configured to receive the granules of loosefill insulation; and
   a distribution hose connected to the distribution mechanism and configured to convey the granules of loosefill insulation from the apparatus to a building insulation cavity;
   wherein a choke is positioned between the high speed conditioners and the side inlet of the rotary valve, the choke configured to redirect larger pieces of rigid board insulation back to the low speed shredders.

* * * * *